April 25, 1967  L. T. FIKE  3,315,311
TIRE CURING APPARATUS
Filed Sept. 28, 1964  2 Sheets-Sheet 1
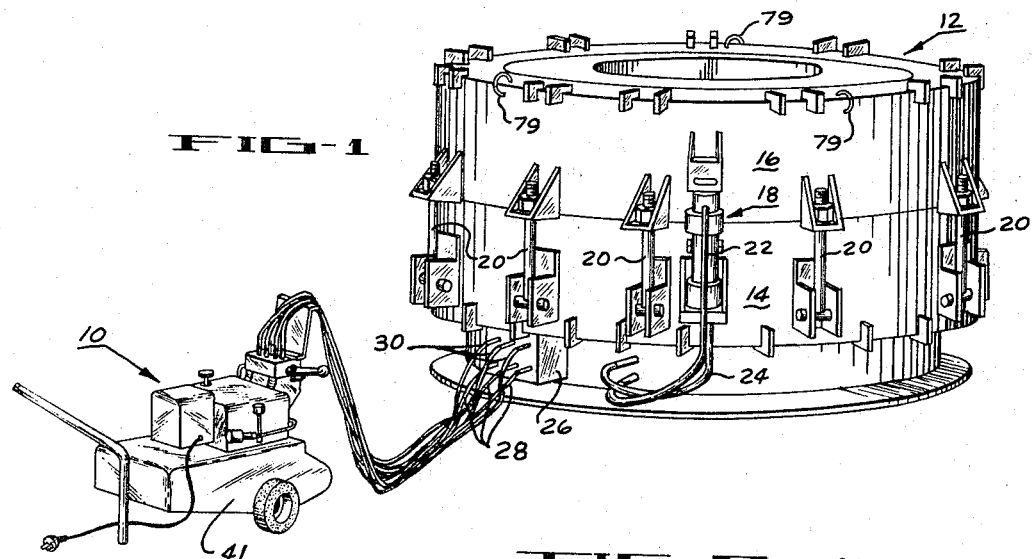
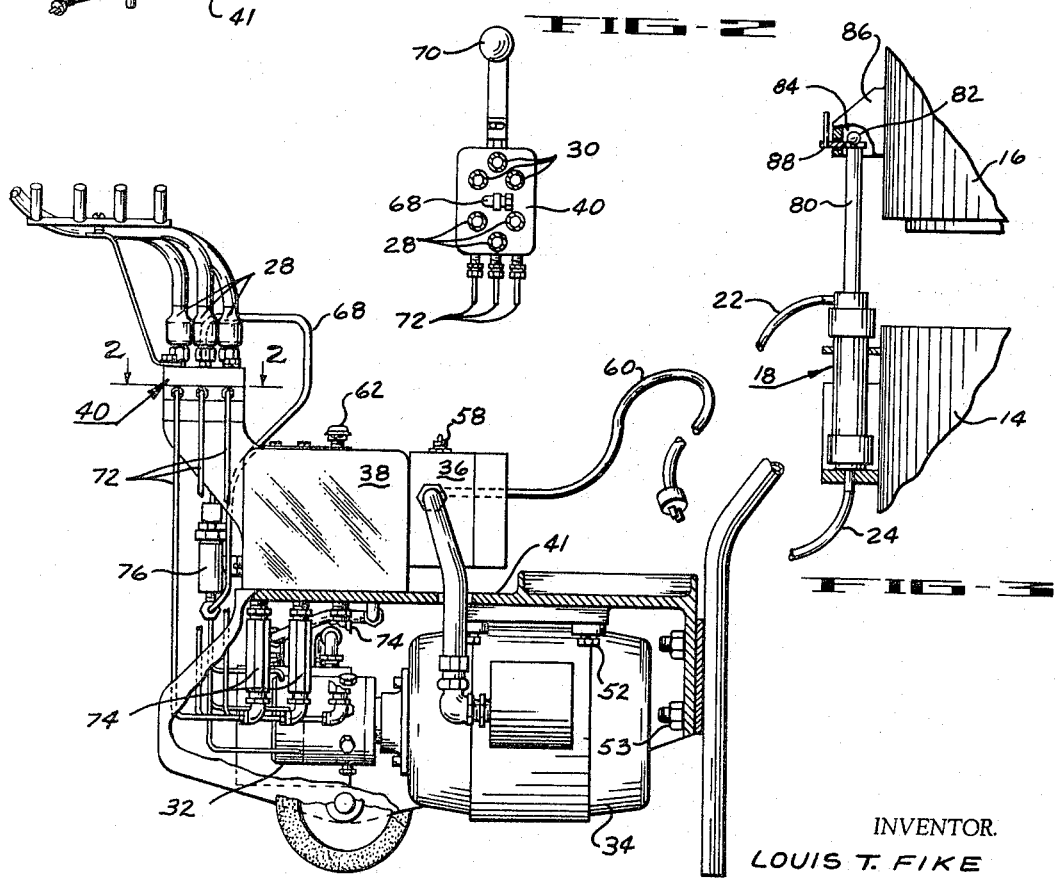
INVENTOR.
LOUIS T. FIKE
BY Fulwider, Patton,
Rieber, Lee & Utecht
ATTORNEYS INVENTOR.
LOUIS T. FIKE
BY Fulwider, Patton,
Rieber, Lee & Utecht
ATTORNEYS

United States Patent Office 3,315,311
Patented Apr. 25, 1967

3,315,311
TIRE CURING APPARATUS
Louis T. Fike, Lodi, Calif., assignor to Super Mold Corporation of California, Lodi, Calif., a corporation of California
Filed Sept. 28, 1964, Ser. No. 399,687
6 Claims. (Cl. 18—18)

This is a continuation-in-part of my copending patent application, Ser. No. 227,420, filed Apr. 30, 1963, and now Patent No. 3,154,814, issued Nov. 3, 1964, said application in turn being a continuation-in-part of my application, Ser. No. 84,447, filed Jan. 23, 1961, and now abandoned.

The present invention relates to tire mold operating apparatus, and more particularly to such an apparatus for automatically separating the upper and lower halves of a tire mold in a uniform manner.

In my Patent No. 3,154,814, issued Nov. 3, 1964, there is disclosed a tire retreading apparatus which includes upper and lower mold halves defining a cavity for receiving a tire casing for retreading. A plurality of fluid actuated cylinder and piston units or rams are coupled between the mold halves and are operative to effect separation of the mold halves for inserting the tire casing and for removing the retreaded tire. My present invention is directed to apparatus of this type wherein the operation of all of the plurality of rams is uniform so that all portions of the upper mold half are moved towards and away from the lower mold half at an identical rate, thereby providing parallel opening and closing of the mold. This parallel action is necessary to avoid harmful chafing of the new uncured tread rubber on the tire which would occur if the upper half of the mold were cocked at an angle during closing movement. In addition, an out of parallel movement of the upper mold half produces serious mechanical problems, such as binding in the rams and at the connections of the rams with the upper mold half.

It is a major object of the present invention to provide a tire retreading apparatus wherein the upper and lower mold halves undergo automatic parallel opening and closing movements.

Another object of the present invention is to provide apparatus of the aforedescribed character having upper and lower mold halves movable relative to each other by a plurality of fluid actuated rams, each of such rams undergoing simultaneous and identical operation to thereby move all portions of one mold half at a uniform rate relative to complemental portions of the other mold half.

A further object of the present invention is to provide apparatus of the aforedescribed nature which includes a lower mold half, an upper mold half, and a plurality of double acting, fluid actuated rams connected between the mold halves for effecting relative vertical movement between the mold halves, the rams being actuated by pump means that include a plurality of pump sections simultaneously operative to provide separate fluid outputs characterized by equal rates of flow, and valve means including a plurality of valve sections simultaneously operative to apply said fluid outputs to a corresponding plurality of the rams for moving all portions of the upper mold half at a uniform rate.

A further object of the present invention is to provide tire retreading apparatus of the aforedescribed character in which the ram pump means and valve means are mounted upon a wheeled cart adapted for movement between a plurality of like retreading apparatus. With this arrangement, a single cart may be utilized on the sequential loading of a number of retreading apparatus with tire casings, and thereafter utilized in the sequential unloading or removal of the cured, retreading tire casings.

Another object of the present invention is to provide tire retreading apparatus of the aforedescribed nature having means for providing simultaneous fluid inputs to a plurality of rams for effecting uniform parallel opening and closing of the upper and lower mold halves, and which includes pressure relief means to prevent excessive pressure building in the rams, and which also includes pressure operated valve means for maintaining a minimum pressure level in the rams so that the upper mold half can be closed only by applying a fluid pressure in excess of such minimum pressure level.

A further object of the present invention is to provide a tire molding apparatus of the aforedescribed nature which is relatively inexpensive to manufacture characterized by an extended service life, and is relatively easy to operate.

Other objects and advantages of the present invention will become apparent from consideration of the following description taken in connection with the accompanying drawings, wherein:

FIG. 1 is a perspective view of a preferred form of tire retreading apparatus embodying the present invention;

FIG. 2 is an enlarged plan view of a valve means utilized with said apparatus;

FIG. 3 is an enlarged side elevational view of one of the rams of the tire retreading apparatus illustrated in FIG. 1;

FIG. 4 is a side elevational view, partially in section, illustrating ram actuating means of said tire retreading apparatus;

Figure 5:
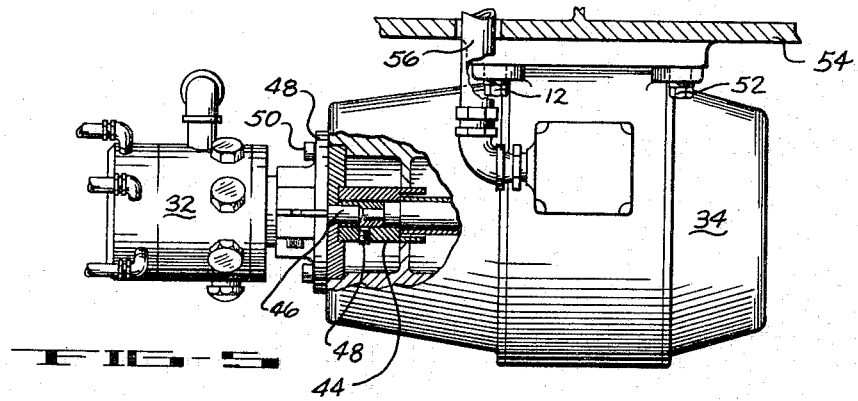
FIG. 5 is a side elevational view of a fluid pump means and associated electric motor forming part of said apparatus.

Referring now to the drawings and particularly FIG. 1, there is illustrated a preferred form of tire retreading apparatus embodying the present invention. This apparatus includes a combined power and control unit, generally designated 10, and a mold unit, generally designated 12. The mold unit 12 includes a lower mold half 14, an upper mold half 16, and a plurality of like double acting, fluid actuated rams, one of which is illustrated at 18. Three of the rams 18 are equally spaced about the circumference of the mold halves 14 and 16.

Each ram 18 includes a cylinder and a piston (not shown) which are connected to different ones of the mold halves 14 and 16 so that application of fluid under pressure to one side of the piston causes the upper mold half 16 to be raised, while application of fluid pressure to the opposite side of the piston effects closing or lowering of the upper mold half 16.

Actuating fluid for this purpose is introduced into the upper end of each ram 18 by a hydraulic line 22 and into the lower end of the ram 18 by a hydraulic line 24. The lines 22 and 24 for all of the rams 18 are connected to a coupling assembly 26, the end couplings for the lines 22 being arranged in a row above the row of couplings for the lines 24 to facilitate connection of the operating apparatus 10 to the mold apparatus 12. More particularly, three hydraulic lines 28 are detachably connected to the coupling for the lines 22 and three to the similarly connected couplings for the lines 24. As will be apparent to those skilled in the art, the lines 28 and 30 alternately constitute the inputs to and outputs from the rams 18 during opening and closing movements of the upper mold half 16.

The unit 10 simultaneously provides the various rams 18 with the inputs characterized by substantially identical rates of flow so that opening and closing movements of the upper mold half 16 is uniform, that is, there is "parallel opening and closing" of the upper mold half 16 relative to the lower mold half 14.

For this purpose the unit 10 includes a three-section hydraulic pump 32, an electric motor 34 operative to drive the pump 32, a starter 36 for initiating operation of the motor 34, a fluid reservoir 38 to provide a fluid source for the pump 32, a four-way valve, generally designated 40, to accept the three outputs of the pump 32 and apply them to the rams 18, and also to direct the three drain or outlet flows from the three rams 18 back to the reservoir 38, and a portable cart or wheeled frame 41 for mounting these components.

More particularly, the pump 32 is an electric motor-driven type which is actually three identical separate pumps (not shown) mechanically connected together. The three pumps are driven by the same shaft so that they all pump the same volume of fluid per increment of time and thereby provide the same rate of fluid flow through three lines 42 for each of the three rams 18. Pumps of this type are commercially available, one satisfactory type being the Racine Seco Piston Pump manufactured by Racine Hydraulics and Machinery, Inc., Racine, Wisconsin. Although the particular pump 32 is adapted to provide a quite greater number of equal and separate fluid outputs, only three sections are utilized by the present apparatus and the remaining outlet ports of the pump are suitably plugged or tapped as illustrated. Since this type of pump is well known in the art, a detailed description of its particular construction is not necessary. It will be apparent that any pump may be utilized which is characterized by a plurality of separate outputs, each providing the same rate of fluid flow per increment of time.

The electric motor 34 illustrated is a conventional 60 cycle, three-phase type, and in one satisfactory embodiment has a rating of one horsepower at 1750 r.p.m. As best illustrated in FIG. 5, the outer extremity of a drive shaft 44 of the motor 34 is coupled to a shaft 46 of the pump by means of a set screw 48 for rotation of the pump by the motor. The pump 32 is supported in position by a mounting flange 48 thereof which is secured by a plurality of bolts 50 to the adjacent end of the housing for the motor 34. The motor 34 is itself secured to the underside of the horizontal bed or platform 54 of the frame 41 by a plurality of mounting bolts 52 which are disposed through the electric motor frame and into the frame bed. Other bolts 53 secure platform 54 to a vertical portion of the frame 41, as will be apparent.

The electrical leads or cables for energizing the motor 34 are carried in an electrical conduit 56 which extends upwardly from the motor and passes through the frame bed 54 for connection to the starter 36.

The starter 36 is of usual and conventional construction and will not be described in detail, it being sufficient to note that the starter 36 is of that type adapted to initiate operation of 60 cycle three-phase motors without unduly loading either the motor or the circuits of the power source. The starter 36 is operated by actuation of a switch 58, located on the top of the starter, which applies power to the starter 36 from a flexible cord 60 which is adapted to be plugged into a conventional three-phase outlet receptacle (not shown).

Figure 6:
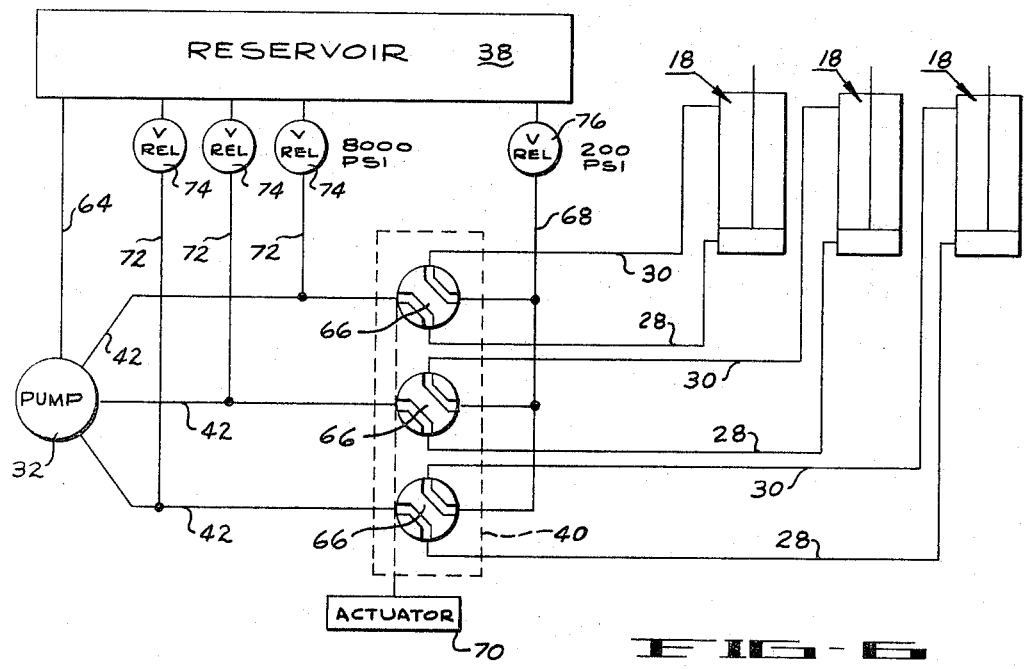
FIG. 6 is a diagrammatic showing of the various components and hydraulic coupling lines of said apparatus.

The fluid reservoir 38 is the usual tank or container for the hydraulic system and includes a filler and breather cap 62 at the top, and a hydraulic line 64 for coupling the reservoir and the pump 32, as schematically illustrated in FIG. 6.

As schematically illustrated in FIG. 6, the valve 40 is actually three separate valve sections 66 which are adapted to simultaneously route or apply the three outputs of the hydraulic pump 32 to the three rams 18, and also simultaneously drain output fluid from the three rams 18 to the fluid reservoir 38.

The valve 40 is shown diagrammatically as including a rotatable central portion having a pair of passages therein which, in the position illustrated, couple the pump discharge lines 42 to the hydraulic lines 28, and also couple the hydraulic lines 30 to a common drain line 68. As will be apparent, the valve sections 66 can be actuated to another position in which the passages thereof interconnect the pump discharge lines 42 with the hydraulic lines 30, and connect the hydraulic lines 28 to the common drain line 68. An actuator 70 is diagrammatically illustrated as being coupled to the three valve sections 66 for operating the valve sections 66 to one or the other of the above-described positions. Various forms of valves may be used for this purpose, it being important only that the valve sections 66 be capable of simultaneous actuation for simultaneously applying the fluid in the pump discharge lines 42 to the rams 18 of the mold apparatus 12, while also draining fluid from the rams 18 to the reservoir 38 through the common drain line 68.

The pump discharge lines 42 are coupled by pressure relief lines 72 to the reservoir 38, each of the lines 72 including a pressure relief valve 74 adjusted to open at a predetermined pressure, such as 8000 p.s.i., for example. With this arrangement, operating pressures in the rams 18 are never allowed to exceed a safe pressure limit, such as the 8000 p.s.i. recited. If the pressure in one or more of the rams 18 exceeds this pressure, the valve or valves 74 opens to dump fluid into the reservoir 38 until the high pressure condition is eliminated.

The common drain line 68 empties into the reservoir 38 through a pressure relief or control valve 76 which is adjusted to open at pressures in excess of a predetermined minimum pressure, such as 200 p.s.i., for example. As will be seen, this requires that a pressure in excess of 200 p.s.i. be exerted upon the pistons of the rams 18 in order to effect movement of the upper mold half 16. Accordingly, the upper mold half 16 will be prevented from lowering due to its weight.

The present apparatus 10 is operated by first coupling the hydraulic lines 28 and 30 to the coupling assembly 26 to thereby effect connection of lines 28 and 30 to the lower and upper extremities of the ram cylinders. The lines 28 are thus adapted to apply pressure fluid to the underside of the ram pistons and the lines 30 are adapted to apply pressure fluid to the upper side of the ram pistons. Since the piston rods are connected to the upper mold half 16 and the ram cylinders are fixed to the lower mold half 14, pressure fluid passing to the rams through the lines 28 will cause the upper mold half 16 to be raised, with the lines 30 simultaneously carrying away drain fluid to the reservoir 38. Conversely, when pressure fluid is applied to the rams 18 through the lines 30, the upper mold half 16 is closed and the lines 28 serve as drain lines.

The outlet cord 60 is next plugged into any suitable 220 volt, three-phase, 60 cycle A.C. outlet, and the actuator 70 operated so that the passages of the valve sections 66 will route or direct fluid from the pump discharge lines 42 to the hydraulic lines 28. The starter button 58 is next actuated to energize the electric motor 34 and operate the pump 32. The three simultaneous and equal flows of hydraulic fluid pass from the pump discharge lines 42, through the valve 40, and then into the lines 28 to the rams 18 for raising the upper mold half 16. In this regard, it is important to note that by reason of the equal rates of fluid input to the three rams 18, the mold half 16 is raised uniformly and in parallel fashion relative to the lower mold half 14. This is an important feature of the present invention in that it prevents undesirable binding of the elements of the rams 18.

As the upper mold half 16 raises, drain fluid from the rams 18 passes through the lines 30, through the four-way valve 40, through the drain line 68, through the pressure control valve 110 and finally to the fluid reservoir 38. As previously described, the pressure control valve 110 will drain the rams 18 only at pressures in excess of 200 p.s.i., which is particularly important to prevent inadvertent "creeping" or closing movement of the upper mold half 16 in the absence of positive pressures in excess of 200 p.s.i.

When the upper mold half 16 has been raised by the rams 18 it is vertically removed from the lower mold half by means of a conventional hoist (not shown), such hoist being engageable with lifting rings 79 formed on the upper mold half. Referring to FIG. 3, quick-releasable lock means are interposed between the upper end of each ram shaft 80 and the upper mold half 16. Such means include a ball 82 formed on the upper end of each shaft that enters a complementary socket 84 formed in a bracket 86 affixed to the upper mold half and a retainer 88 selectively insertable into socket 84 to engage the lower portion of the ball 82 to thereby temporarily secure the bracket (and hence the upper mold half) to the ram shaft 80. This arrangement is described in complete detail in my aforementioned patent application Ser. No. 849,550. It will be understood that removal of retainers 88 from the sockets 84 permits the upper mold half to be lifted off of the lower mold half. A tire to be retreaded may then be loaded and/or unloaded from the lower mold half.

After a tire to be retreaded has been positioned within the lower mold half, lowering of the upper mold half 16 is accomplished by moving the actuator 70 to position the valve sections 66 for channeling fluid from the pump 32 to the lines 30 for discharge adjacent the upper side of the ram pistons, and for draining fluid from the rams 18 through the lines 28, through the drain line 68, through the pressure control valve 76, and then into the reservoir 38. The casing of the tire to be retreaded is covered with uncured tread rubber in a manner well-known in the art. It is an important advantage of the aforedescribed apparatus that the resultant parallel closing action of the upper mold half 16 relative to the lower mold half 14 eliminates harmful chafing of such new uncured tread rubber on the tire to be retreaded, as the upper mold half closes downwardly on the lower mold half.

From the foregoing it is seen that the present apparatus is adapted to provide synchronized movement of the rams of tire retreading apparatus in an economical, easily controlled manner. The apparatus provides hydraulic pressures at the rams 18 according to the load required at each ram, and excessive pressures are prevented by operation of the relief valves 74. Moreover, the upper mold half 16 can be maintained at any degree of opening by merely operating the switch 58 to stop operation of the motor driven pump 32 at the appropriate time.

Various modifications and changes may be made with respect to the foregoing detailed description without departing from the spirit of the invention or the scope of the following claims.

I claim:

1. Tire curing apparatus, comprising:
    a lower mold half formed with a cavity that receives the lower part of a tire to be cured;
    a coaxial upper mold half formed with a cavity that receives the upper part of a tire to be cured, and said upper mold half being vertically removable from said lower mold half for admitting and discharging a tire to be cured;
    quick-releasable securing means interposed directly between said mold halves that when engaged retain said mold halves secured against relative vertical movement, said upper mold half being removable from said lower mold half when said securing means are disengaged;
    a plurality of vertically extending fluid pressure-actuating rams, each having a cylinder secured directly and rigidly to said lower mold half and a vertical shaft reciprocally extending from the upper end of said cylinder;
    quick-releasable lock means operatively interposed between the upper end of said shafts and said upper mold half, said lock means when disengaged permitting said upper mold half to be removed from said shafts and said lock means when engaged cooperating with said connection means to secure said shafts to said upper mold half whereby said shafts effect vertical movement of said upper mold half while restraining said upper mold half against horizontal movement; and
    a power and control means for said rams operable to urge each of said ram shafts upwardly or downwardly at a uniform rate to thereby effect parallel opening and closing of said upper mold half relative to said lower mold half.

2. Apparatus as set forth in claim 1 wherein said power and control means includes fluid pump means having a plurality of pump sections simultaneously operative to provide separate fluid outputs characterized by equal rates of flow, and valve means including a plurality of valve sections simultaneously operative to apply said fluid outputs to said rams for moving all portions of said upper mold half at a uniform rate.

3. Apparatus as set forth in claim 1 wherein said power and control means includes fluid pump means having a plurality of pump sections simultaneously operative to provide separate fluid outputs characterized by equal rates of flow, valve means having a first position and a second position and including a plurality of valve sections simultaneously operative in said first position to apply said fluid outputs to one of each of the pistons of said rams for raising all portions of said upper mold half at a uniform rate, and operative in said second position to apply said fluid outputs to the opposite side of the pistons of said rams for lowering all portions of said upper mold half at a uniform rate, a fluid reservoir, and pressure relief means coupled to said fluid reservoir and to said valve means and operative to establish an upper pressure limit for said fluid outputs in said first position of said valve means.

4. Tire curing apparatus for use with a hoist, comprising:
    a lower mold half formed with a cavity that receives the lower part of a tire to be cured;
    a coaxial upper mold half formed with a cavity that receives the upper part of a tire to be cured, and said upper mold half being vertically removable from said lower mold half for admitting and discharging a tire to be cured;
    quick-releasable securing means interposed directly between said mold halves that when engaged retain said mold halves secured against relative vertical movement, said upper mold half being removable from said lower mold half when said securing means are disengaged;
    a plurality of vertically extending fluid pressure-actuat rams, each having a cylinder secured directly and rigidly to said lower mold half, a piston in said cylinder and a vertical shaft secured to said piston and reciprocally extending from the upper end of said cylinder;
    means on said upper mold half engageable with said hoist;
    quick-releasable lock means operatively interposed between the upper end of said shafts and said upper mold half, said lock means when disengaged permitting said upper mold half to be completely removed from said shafts and said lower mold half by said hoist and said lock means when engaged cooperating with said connection means to secure said shafts to said upper mold half whereby said shafts effect vertical movement of said upper mold half while restraining said upper mold half against horizontal movement; and
    a power and control means for said rams operable to urge each of said ram shafts upwardly or downwardly at a uniform rate to thereby effect parallel opening and closing of said upper mold half relative to said lower mold half.

5. Tire curing apparatus as set forth in claim 4 wherein said power and control means is on a wheeled cart whereby it may be utilized to operate a plurality of like apparatus.

6. Tire curing apparatus as set forth in claim 4 wherein said power and control means includes fluid pump means having a plurality of pump sections simultaneously operative to provide separate fluid outputs characterized by equal rates of flow, an electric motor coupled to said hydraulic pump means for operation thereof, a fluid reservoir coupled to said hydraulic pump means to provide input fluid thereto, valve means coupled to said reservoir and to said hydraulic pump means and having a first position and a second position, said valve means including a plurality of valve sections simultaneously operative in said first position to apply said fluid outputs to one side of each of the pistons of said rams and to exhaust fluid from the opposite sides of said piston to said reservoir to thereby raise all portions of said upper mold half at a uniform rate, said valve sections being operative in said second position to apply said fluid outputs to said opposite sides of said pistons and to exhaust fluid from said one side of each of said pistons to said reservoir to thereby lower all portions of said upper mold half at a uniform rate, and pressure operated valve means coupled between said valve means and said reservoir and operative to prevent fluid flow from said one side of said pistons below a predetermined pressure whereby the pressure of said fluid outputs must exceed said predetermined pressure in order to lower said upper mold half.

References Cited by the Examiner
UNITED STATES PATENTS

| | | | |
|---|---|---|---|
| 2,596,854 | 5/1952 | Jack et al. | 25—131 |
| 3,015,845 | 1/1962 | Duerksen | 18—18 |
| 3,074,109 | 1/1963 | Duerksen | 18—18 |
| 3,137,032 | 6/1964 | MacMillan | 18—18 XR |
| 3,154,814 | 11/1964 | Fike | 18—18 |

J. SPENCER OVERHOLSER, *Primary Examiner.*

J. HOWARD FLINT, Jr., *Examiner.*